United States Patent [19]

N'Guyen Uyen

[11] 4,424,558
[45] Jan. 3, 1984

[54] FREELY COMMUTATING CHOPPER CIRCUIT

[75] Inventor: Thuy N'Guyen Uyen, LaVerpilliere, France

[73] Assignee: Societe CEM Compagnie ElectroMecanique et Cie, Paris, France

[21] Appl. No.: 284,211

[22] Filed: Jul. 17, 1981

[30] Foreign Application Priority Data

Jul. 17, 1980 [FR] France ................ 80 15805

[51] Int. Cl.³ .................................. H02M 3/135
[52] U.S. Cl. ............................ 363/124; 363/135
[58] Field of Search ............. 363/124, 96, 135; 307/240; 318/341, 345 C, 345 CA

[56] References Cited

U.S. PATENT DOCUMENTS

| | | | |
|---|---|---|---|
| 3,445,752 | 5/1969 | Horvat | 323/272 |
| 4,135,236 | 1/1979 | Mann et al. | 363/124 |
| 4,257,092 | 3/1981 | Prines et al. | 363/124 |

FOREIGN PATENT DOCUMENTS

| | | | |
|---|---|---|---|
| 2257754 | 5/1973 | Fed. Rep. of Germany | 363/124 |
| 1575652 | 7/1969 | France | 318/341 |

Primary Examiner—William H. Beha, Jr.
Attorney, Agent, or Firm—Burns, Doane, Swecker & Mathis

[57] ABSTRACT

The invention relates to a chopper circuit with free commutation for the supply of power to a load from a source of direct current. It comprises a principal thyristor with a return diode, a series resonant circuit as the commutation circuit and a free-wheeling diode. The free-wheeling diode is parallel to the capacitor of the resonant circuit so that the coil serves both as the commutation circuit and the coil to limit variations of the current in the thyristor. The circuit is particularly suitable for use with electric traction motors.

4 Claims, 8 Drawing Figures

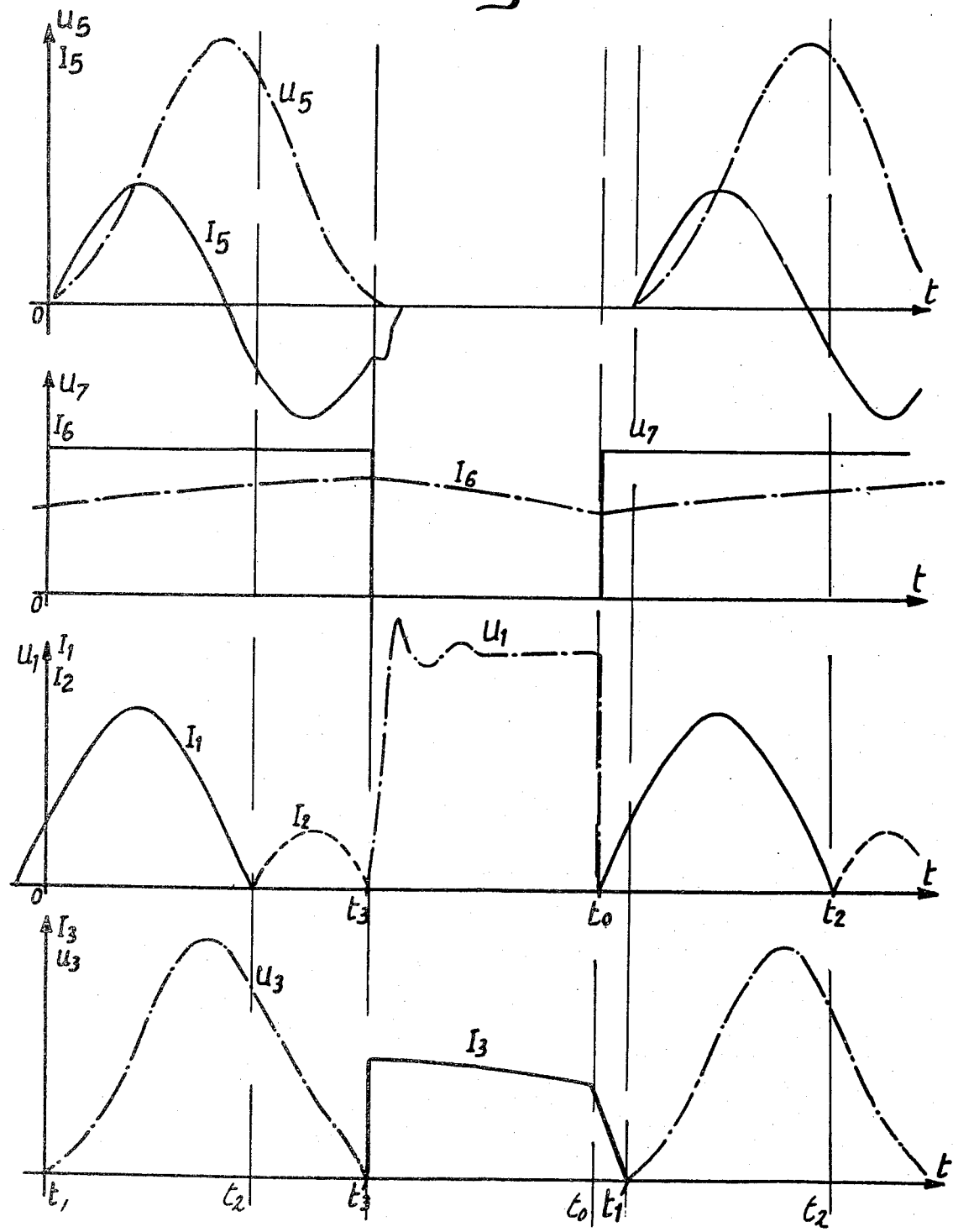

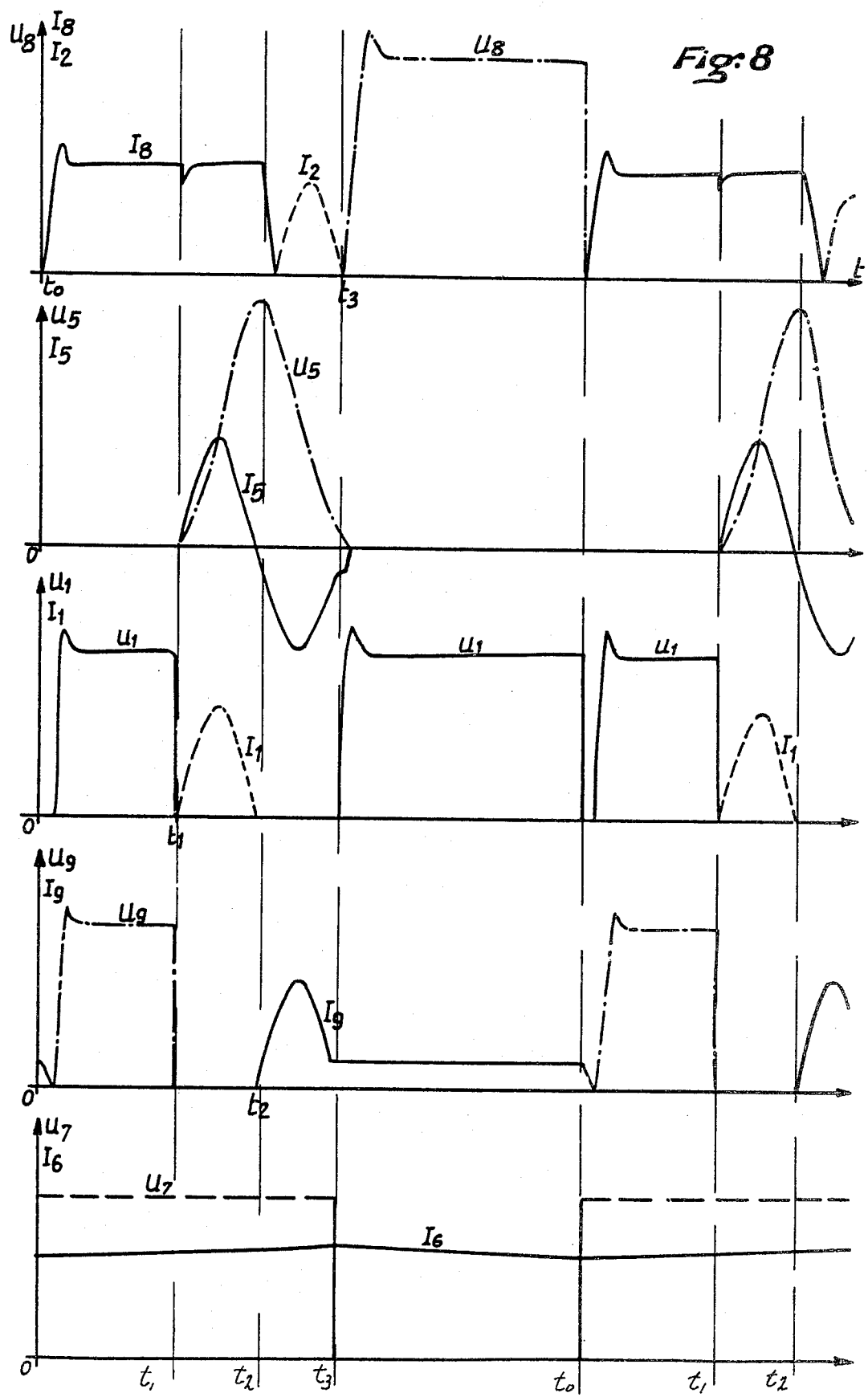

FREELY COMMUTATING CHOPPER CIRCUIT

BACKGROUND OF THE INVENTION

The present invention relates to a chopper circuit with free commutation, for supplying power from a direct current source. This type of circuit is particularly applicable to electric traction motors.

Examples of prior art chopper circuits are shown in FIGS. 1 and 2. In these examples, a resonant series circuit effects commutation, and a coil is provided, either in series with the free-wheeling diode or in series with the principal thyristor, to limit the variations of the current as a function of time. In these two prior art circuits, two coils with highly different functions are always present: one in the resonant circuit, and the other, i.e., the limiting coil, in series with the free-wheeling diode or the thyristor in a circuit connected across the current source.

The presence of the limiting coil, as well as that of the resistance and capacitance protection grid at the terminals of the free-wheeling diode, generate overvoltages during each period of blockage, i.e. non-conduction, of the free-wheeling diode.

A further disadvantage of these prior art circuits lies in the fact that the principal thyristor of the chopper receives a current which is a combination of the supply current and the oscillating current of the commutation circuit. Consequently, it is subject to severe restrictions in current and power.

It is therefore a general object of the present invention to provide a novel chopper circuit having small volume and limited weight, in which electrical stresses are limited and the output voltage is free of transistory overvoltages.

Another object of the invention is to provide a freely commutating chopper circuit operable at either a variable or fixed frequency, and of a particularly simple design.

SUMMARY OF THE INVENTION

In accordance with the invention, a freely commutating chopper circuit for supplying power from a source of direct current comprises a principal thyristor and a return diode connected in reverse parallel relationship to the thyristor, a resonant series circuit connected in parallel with the current source as the commutation circuit, and a free-wheeling diode in parallel with the current supply source. The invention is characterized in that the free-wheeling diode is in parallel with the capacitor of the resonant series circuit and in series with the coil of the resonant circuit, so that the coil serves both as the commutation coil in the resonant circuit and as the coil limiting the variations of the current in the principal thyristor.

Further characteristics of a chopper circuit according to the invention can include:
(a) a second thyristor connected in reverse parallel relationship with the return diode and an auxiliary diode having one terminal connected to the junction of the principal thyristor and the coil, and its other terminal connected to the junction of the second thyristor and the return diode;
(b) a discharge circuit in parallel with the capacitor of the resonant series circuit;
(c) the discharge circuit for the capacitor can comprise an auxiliary thyristor, a coil and a resistance mounted in series.

BRIEF DESCRIPTION OF THE DRAWINGS

Other features of the invention will become apparent from the description hereinbelow with reference to the accompanying drawings, wherein:

FIG. 7 is a graphical representation of currents and voltages in the circuit of FIG. 3; and FIG. 8 is a graphical representation of the currents and voltages in the circuit of FIG. 4, when operating at a fixed frequency.

DETAILED DESCRIPTION

Figure 1:
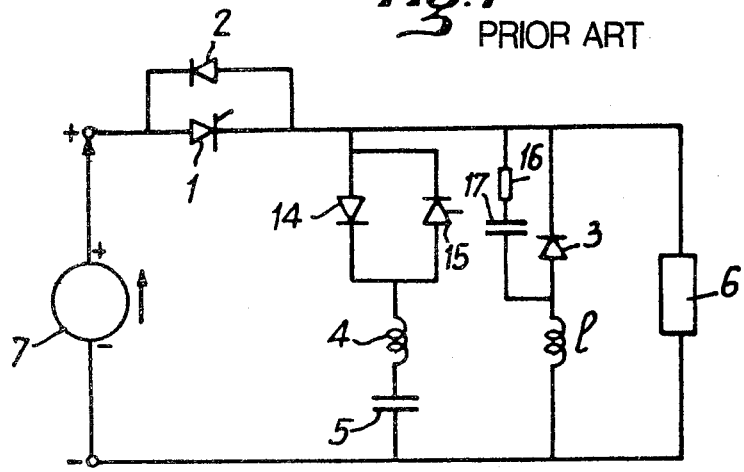
FIG. 1 is a schematic circuit diagram of an embodiment of a prior art chopper circuit with a limiting coil in series with the free-wheeling diode.
Figure 2:
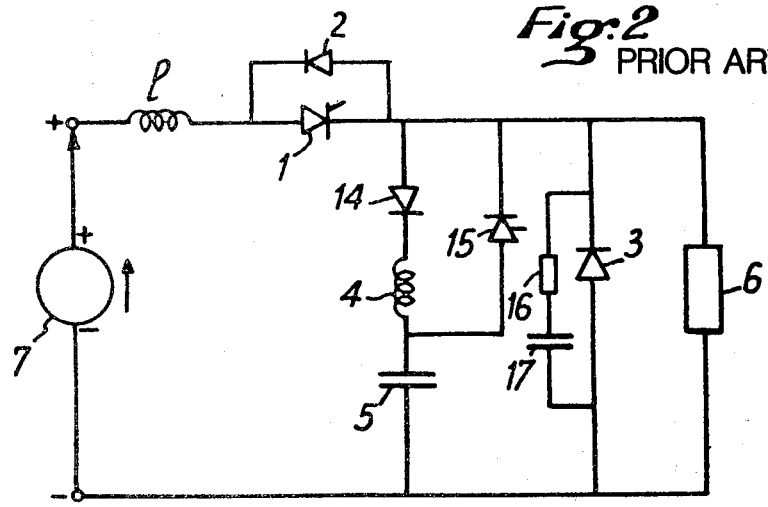
FIG. 2 is a schematic circuit diagram of another embodiment of a prior art chopper circuit with the limiting coil in series with the principal thyristor.

Referring now to the drawings, the prior art chopper circuits illustrated in FIGS. 1 and 2 are placed between a source 7 of direct current and a load 6. They comprise essentially a principal thyristor 1 with a return diode 2 mounted in reverse parallel relationship, a resonant series circuit for commutation comprising a coil 4 and a capacitor 5, and a free-wheeling diode 3. Usually, a diode 14 is provided in series with the resonant commutation circuit, and a thyristor 15 is connected in reverse parallel relationship with the diode 14. Furthermore, a protective circuit with resistance 16 and capacitor 17 is provided in parallel with the free-wheeling diode.

A coil 1 is further provided to limit the variations of the current as a function of time. This coil is in series either with the free-wheeling diode (FIG. 1), or the principal thyristor (FIG. 2).

Figure 3:
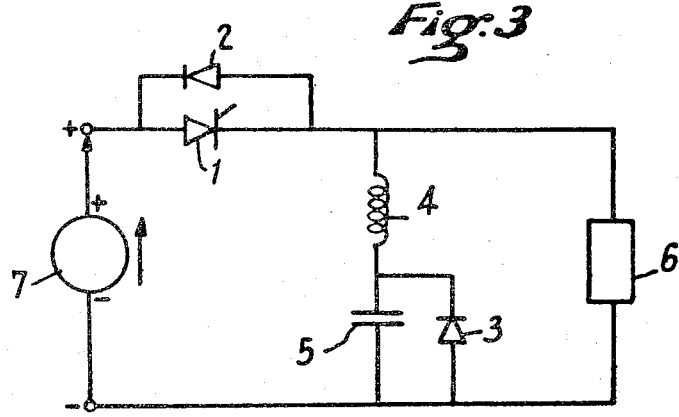
FIG. 3 is a schematic circuit diagram of an embodiment of a chopper circuit according to the present invention.

A chopper circuit according to the invention, illustrated in FIG. 3, differs significantly from the prior art circuits. A principal thyristor 1 with its return diode 2 insures the transfer of energy from the source 7 to the load 6. In parallel with the load, the series resonant circuit for commutation consists only of a coil 4 and a capacitor 5, and a free-wheeling diode is connected in parallel with the capacitor 5 and in series with the coil 4, its anode being connected with the negative pole of the source 7 and its cathode with the junction of the coil 4 and the capacitor 5.

In the operation of the chopper circuit, diagrammed in FIG. 7, when the thyristor 1 is blocked, i.e., non-conducting, the current in the load 6 passes through the free-wheeling diode 3 and the coil 4. The conduction of the diode 3 maintains a zero voltage at the terminals of the capacitor 5. At the instant $t_0$ the thyristor 1 is actuated and conducts, at this instant, a current proportional to the voltage of the source 7 at that time, and inversely proportional to the value of the inductance of the coil 4. When this current is equal to the current in load 6, at the instant $t_1$, the diode 3 is blocked, and the charging current for the resonant circuit is established. The thyristor then conducts the sum of the currents in the load 6, which is essentially constant, and in the resonant circuit 4–5, which is quasi-sinusoidal. As the result of this superposition of currents, the current in the thyristor 1 is cancelled at time $t_2$ and from this instant there is a transfer of the current of the thyristor 1 to the return diode 2, which conducts the difference between the current in the resonant circuit and the current in the load.

When the current is cancelled at time $t_3$, the diode 2 is blocked and, given that the current in the load 6 cannot tolerate a discontinuity, the diode 3 becomes conductive to assure the continuity of current in the load 6. The conduction of the diode 3 thus returns the residual voltage of the capacitor 5 to zero. The circuit is then ready for a new operating cycle.

The voltage at the terminals of the load 6 is equal to the voltage of the source 7 during the entire period of time, wherein either the thyristor 1 or the diode 2 is conducting, and thus appears in the form of a series of castellations, free of any transitory overvoltage. The control of the average voltage on the load 6 is obtained in this case by the variation of the actuating frequency of the thyristor 1.

Figure 4:
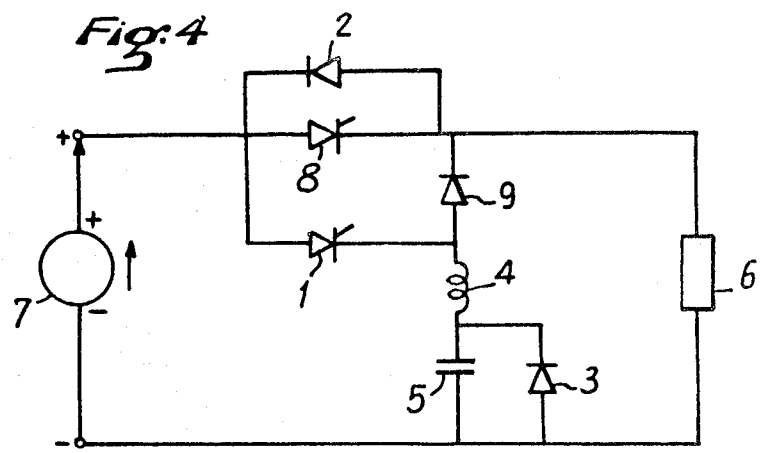
FIG. 4 is a schematic circuit diagram of a second embodiment of a chopper circuit according to the invention having a second thyristor and an auxiliary diode.

In the embodiment of FIG. 4, the basic circuit of FIG. 3 further comprises a thyristor 8, connected in reverse parallel relationship with the diode 2, and a diode 9 inserted between the thyristor 1 and the diode 2, the anode of the diode 9 being connected with the cathode of the thyristor 1 and the cathode of the diode 9 being connected with the anode of the diode 2. This chopper offers two possible modes of operation: operation at variable frequency and operation at a fixed frequency.

For operation at variable frequency, the thyristor 8 does not receive an actuating pulse. Only the thyristor 1 receives actuating pulses at a variable frequency according to the average value of the voltage desired on the load 6. The operating principle is similar to that described for FIG. 3. During the blockage of the chopper, the current in the load 6 flows through the diodes 3 and 9 and the coil 4, and in this case the diodes 3 and 9 play the role of the free-wheeling diodes. Upon the actuation of the thyristor 1, the extinction phase of the diode 3 commences, wherein the current decreases at a rate limited by the coil 4. Beginning at the instant $t_1$, the diode 3 is blocked, the charge of the resonant circuit is initiated, and the diode 9 insures the passage of the current in the load 6. The current in the thyristor 1, which is the sum of the charge current and the resonant current, is cancelled at time $t_2$, which causes the blockage of the thyristor 1, and there is a transfer of current from the thyristor 1 to the diode 2. The diode 9 now insures the conduction of the resonant current, while the diode 2 conducts a current equal to the difference between the resonant current and the load current. At the instant $t_3$, the current in the diode 2 is cancelled, and the diode 2 is blocked. The diode 3 is then actuated to insure the continuity of the current in the load 6 and maintain a zero voltage on the capacitor 5. The device is then ready for a new operating cycle.

The principle of operation at a fixed frequency, depicted in FIG. 8, is as follows:

In the initial state, when the chopper is blocked, the current in the load 6 flows through the diode 3 and 9 and the coil 4. At the instant $t_0$, the thyristor 8 is actuated, with the effect of extinguishing the diodes 9 and 3. The variation of the current in the thyristor 8 and the diodes 3 and 9 is limited by the coil 4. After blockage of the diodes 3 and 9, the thyristor 8 assures the passage of the load current. To block the thyristor 8, the thyristor 1 is actuated at the instant $t_1$, which causes the resonant circuit (coil 4 and capacitor 5) to be charged. The positive wave of the oscillating current passes through the thyristor 1 and the negative wave of the oscillating current returns to the source 7 through the diode 9. At instant $t_2$, the diode 9 conducts and the current in the thyristor 8 begins to decrease; this current is equal to the difference between the load current and the increasing oscillating current. When the current in the thyristor 8 is zero, the diode 2 conducts. The current in the diode 2 is then equal to the difference between the oscillating current and the load current. The conduction of the diode 2 assures the sufficient polarization of the thyristors 1 and 8. Finally, the diode 2 is blocked in turn when its current is extinguished. At this instant $t_3$, the diode 3 conducts to assure the continuity of the current in the load 6, while the capacitor 5 is discharging, following the conduction of the diode 3. The operation is then back to the start and the device is ready for a new operating cycle.

Figure 5:
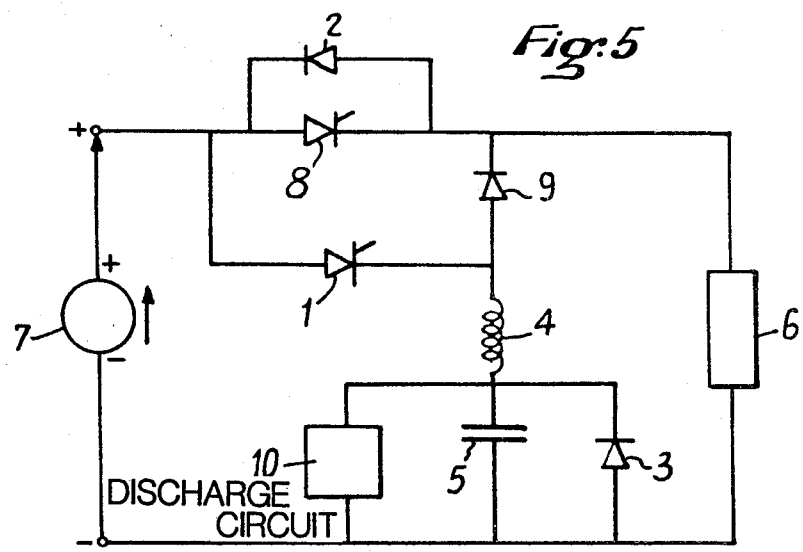
FIG. 5 is a schematic circuit diagram of a variation of the embodiment of a chopper circuit according to the illustration in FIG. 4, wherein a discharge circuit is provided for the capacitor.

In certain cases of application to electric traction motors, where the continuous conduction of the chopper is desired, the circuit of FIG. 5, representing a variation according to the invention, may be used. The circuit of FIG. 5 varies from that of FIG. 4 by a discharge device 10 for the capacitor 5 placed in parallel with the capacitor. The principle of operation is as follows:

When it is desired to place the chopper into continuous conduction, the thyristor 8 is actuated, while the pulses for actuating the thyristor 1 are arrested. The load 6 is then connected with the source 7 by means of the thyristor 8. The function of the device 10 is to prevent a large positive, residual voltage to remain on the capacitor 5 at the moment when the thyristor 1 is reactuated to resume the commutation power of the chopper. In fact, without the device 10, in view of the leakage currents in the semi-conductors 1 and 9, as well as the resistance and capacitance protective grids of these semiconductors, the capacitor 5 would remain more or less charged during the duration of continuous conduction.

The device 10 may consist simply of a resistance, in which case a certain residual voltage remains on the capacitor 5 (at the instant of the resumption of the control of the chopper), which must be considered in designing of the chopper.

Figure 6:
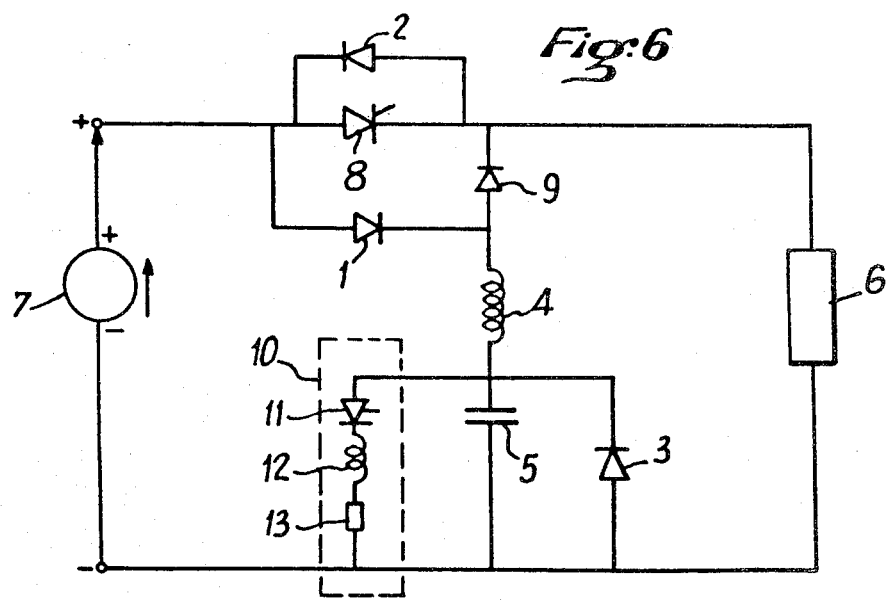
FIG. 6 illustrates a more detailed embodiment of the chopper circuit shown in FIG. 5.

Another variation of the device 10 is shown in FIG. 6. In this case, the device comprises an auxiliary thyristor 11, a coil 12 and/or a resistance 13 in series.

To resume chopper control after a period of continuous conduction of the chopper, prior to any actuation of the thyristor 1, a start is made by actuating the thyristor 11, which has the effect of completely discharging the capacitor 5. The presence of the coil 12 is beneficial in shortening the discharge time of the capacitor 5. The resistance 13 serves to limit the discharge current of the capacitor 5.

The chopper circuit according to the invention is particularly well suited for problems relating to the supply of power to traction motors, for example.

The present invention may be embodied in other specified forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A freely commutating chopper circuit for the supply of power to a load from a source of direct current, comprising
    a principal thyristor;
    a return diode connected in reverse parallel relationship with said thyristor;
    a series resonant commutation circuit connected in parallel with the load; and
    a free-wheeling diode connected in parallel with a capacitor of the series resonant circuit and in series with a coil of said resonant circuit, so that said coil conducts both the commutation current and at least a major portion of the free-wheeling current and thereby serves both as the commutation coil in the resonant circuit and the coil limiting variations of the current in said principal thyristor.

2. A freely commutating chopper circuit for the supply of power to a load from a source of direct current, comprising
    a principal thyristor;
    a return diode connected in reverse parallel relationship with said thyristor;
    a series resonant commutation circuit connected in parallel with the load;
    a free-wheeling diode connected in parallel with a capacitor of the series resonant circuit and in series with a coil of said resonant circuit, so that said coil serves both as the commutation coil in the resonant circuit and the coil limiting variations of the current in said principal thyristor;
    a second thyristor connected in reverse parallel relationship to said return diode; and
    an auxiliary diode connected between the junction of the principal thyristor and the coil, and the junction of the second thyristor with the return diode and the load.

3. A chopper circuit according to claim 2, further comprising a discharge circuit in parallel with the capacitor of the series resonant circuit.

4. A chopper circuit according to claim 3, wherein the discharge circuit for the capacitor comprises an auxiliary thyristor, a coil and a resistance connected in series.

* * * * *